UNITED STATES PATENT OFFICE.

ERWIN HOFFA, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

PROCESS OF PRODUCING YELLOW INSOLUBLE AZO DYES ON THE FIBER.

1,197,633.  Specification of Letters Patent.  Patented Sept. 12, 1916.

No Drawing.  Application filed June 15, 1915.  Serial No. 34,190.

*To all whom it may concern:*

Be it known that I, ERWIN HOFFA, Ph. D., chemist, a citizen of the Empire of Germany, residing at Höchst-on-the-Main, Germany, have invented certain new and useful Improvements in the Process of Producing Yellow Insoluble Azo Dyes on the Fiber, of which the following is a specification.

I have found, that the diazotized esters of 4-nitro-2-aminobenzoic acid give on the fiber, when combined with β-naphthol, yellow tints of excellent fastness to washing and great resistance to the action of chlorin. The dyeings thus obtained can be discharged with hydrosulfite and they are remarkable for their great resistance to the action of chlorate.

The following example illustrates my invention: The goods are padded with β-naphthol in a bath of the following composition, then dried, printed with the printing color indicated hereafter, washed and soaped.

*Naphthol bath.*—Containing one liter and composed of: 25 gr. of β-naphthol, 40 cc. of caustic soda lye of 22° Bé. specific gravity, 20 gr. of acid ricinoleate of ammonia.

*Printing color.*—There are mixed to a paste:

19.6 gr. of methyl ester of 4-nitro-2-aminobenzoic acid with
30 cc. of hydrochloric acid of 22 Bé.; there are then added
150 cc. of boiling water, the whole is well stirred and cooled by adding
250 gr. of ice. Thereupon are gradually added
26 cc. of a nitrite solution (290 gr. per liter), the mixture is stirred for some time, the solution filtered and made up to:

500 gr. The solution is thickened with
460 gr. of tragacanth-thickening (60:1000) and there are added before use
40 gr. of sodium acetate 1 kg.

Having now described my invention, what I claim is

1. The process of producing yellow insoluble azo dyes on the fiber, which consists in combining on the fiber the diazo compounds of the esters of 4-nitro-2-aminobenzoic acid with β-naphthol.

2. The process of producing yellow insoluble azo dyes on the fiber, which consists in combining on the fiber the diazotized methyl ester of 4-nitro-2-aminobenzoic acid with β-naphthol.

In testimony whereof I affix my signature in presence of two witnesses.

ERWIN HOFFA.

Witnesses:
MICHAEL ZIMMERMANN,
K. MÜNCH.

Copies of this patent may be obtained for five cents each, by addressing the "Commissioner of Patents, Washington, D. C."